United States Patent Office 3,112,297
Patented Nov. 26, 1963

3,112,297
OLEFIN POLYMERIZATION WITH CATALYST CONTAINING SiCl₄ EXTRACT OF TRANSITION METAL OXIDE
Leon B. Gordon, Valparaiso, Ind., Truman P. Moote, Tulsa, Okla., and Hartley Eckstrom, Lexington, Ky., assignors to Standard Oil Company, Chicago, Ill., a corporation of Indiana
Filed June 22, 1960, Ser. No. 38,061
15 Claims. (Cl. 260—88.2)

The present invention relates to a novel olefinic polymer, a method of preparing an olefinic polymer, a novel catalyst composition and the use of a novel catalyst composition to polymerize olefins. More particularly, it is concerned with the use of such catalysts in preparing olefinic polymers ranging in consistency from oils to rubbery solid substances.

We have discovered that mono-olefins such as, for example, ethylene, propylene, butene, pentene-1, and the like; diolefins such as, for example, butadiene, isoprene, chloroprene, and the like; aromatics such as, for example, styrene and the like can be polymerized separately or conjointly under relatively mild conditions in the presence of our new catalysts to produce oils and/or solid polymers. These catalysts are made up of a first component which is a silicon halide extract of a transition metal oxide and a second component which may be an organometallic compound or an alkali metal hydride of boron or aluminum.

The preferred procedure for preparing the first component, i.e., the silicon halide extract of transition metal oxide comprises preheating the transition metal oxide to a temperature of from 100–200° C. and typically from 120–175° C. and preferably, a temperature of about 150° C. to insure anhydrous conditions. The silicon halide is added to the metal oxide and allowed to remain in contact with the transition metal oxide until the silicon halide solution contains an amount of the compound sufficient to give an analysis of from about 1 wt. percent to about 10 wt. percent and preferably from 4 wt. percent to 7 wt. percent metal. The rate at which this extraction takes place is enhanced by temperatures in excess of 60° C. The silicon halide extract is then used as the first component of our catalyst. The preparation of our silicon halide extract solution may be effected in the presence of a suitable solvent such as, for example, a saturated hydrocarbon, preferably, with a boiling range of from about 80° to about 250° C. While certain liquid aromatic hydrocarbons may be suitable as solvents for the preparation of our extract, such materials frequently tend to become alkylated with the olefin it is intended to polymerize under the conditions employed. Accordingly, it is generally preferable to remove the aromatic solvent from the extract prior to the use of the extract in the process of our invention. In general, it may be said that any of the well known solvents such as chlorinated hydrocarbons, and the like, which are inert with respect to the reactants involved, and which boil generally within the above stated range, are likewise suitable for use in the preparation of our catalyst. Such solvents may also be employed in carrying out the principal polymerization reaction.

The preferred form of the silicon compound used in carrying out the process of our invention is the tetrachloride. However, other silicon compounds such as, for example, the tetrabromide may also be used. In addition, various hydrocarbon derivatives of silicon halide may be substituted for the silicon tetrahalides mentioned above. As examples of such derivatives, there may be mentioned dimethyl dibromosilane, dimethyl dichlorosilane, trimethyl bromosilane, diphenyl dichlorosilane, phenyl methyl dichlorosilane, and the like.

The preferred form of the transition metal oxides used in carrying out the process of our invention is vanadium pentoxide. Other oxides of transition metals in groups IV, V, and VI of the periodic chart of the elements such as, for example, titania, zirconia, molybdenum, chromium, and the like may be used.

The second component involved in our new catalyst is an organometallic compound, a hydrocarbon derivative of boron or aluminum or an alkali metal hydride of boron or aluminum. The organometallics used for preparing our catalyst constitute a wide variety of compounds. The metals in the organometallic compounds contemplated are taken from groups IA to IIIA and IIB of the periodic chart of the elements. Organometallic compounds derived from the following metals may be used in preparing the catalysts employed in the process of our invention: Li, Na, K, Rb, Mg, Ca, Zn, Al, Ga, In, Tl, or mixtures of such derivatives. Typical of such compounds are $NaAl(C_3H_7)H_3$, $Zn(C_2H_5)_2$, $LiC_4H_9$, $C_2H_5MgI$, phenyl magnesium bromide, $C_5H_9ZnI$, $LiAl(C_2H_5)H_3$, organoaluminum compounds, such as the trialkylaluminums, the triarylaluminums, preferably, the lower molecular weight derivatives such as triisobutylaluminum, triethylaluminum, triamylaluminum, and the like.

Hydrocarbon derivatives of boron which may be used in practicing our invention include the alkyl boron and the aryl borons. Examples of such compounds are trimethyl boron, triethyl boron, tributyl boron, tridecyl boron, and the like. Typical of the aryl borons that may be employed are triphenyl boron, tritolyl boron, tri-p-xylyl boron, trinaphthyl boron, and the like.

The aluminum and borohydrides making up the alternate second component, likewise constitute a large group of materials. As examples of these compounds, there may be mentioned $NaAlH_4$, $LiBH_4$, $NaBH_4$, $LiAlH_4$, together with complex metal hydrides such as, $NaAl(C_3H_7)H_3$, mentioned above.

The preferred method of preparing the catalyst comprises contacting the silicon halide with the transition metal oxide directly or alternatively in the presence of an inert solvent. This step may be carried out at atmospheric pressure and room temperature. Preferably this step is carried out at autogenous pressures with temperatures in excess of 60° C. for a period of from at least 1 hour to at least 24 hours. We have noticed the above conditions to be particularly characteristic of silicon tetrachloride-vanadium pentoxide mixtures. After allowing the silicon tetrachloride to extract the vanadium pentoxide for the prescribed length of time at the prescribed temperatures, the residue, i.e., the solid particles, is removed from the mixture and the extract is preferably added directly to the olefin feed stream. Thereafter, the remaining second component, i.e., the organometallic compound, is subsequently mixed with the olefinic feed and the silicon tetrachloride extract.

While in most instances it is usually desirable to use these olefins in as pure form as possible, mixtures of such olefins can also be employed and other substances inert under the polymerization conditions utilized can be present. For example, the crude product stream from the dehydrogenation of a normally gaseous paraffin hydrocarbon may be used directly in the process of our invention. Likewise, refinery fractions of ethylene, propylene, butylenes or mixtures of such fractions, may be used if desired. Such materials should generally be ploymerized in the absence of contaminants which react with either the catalyst or with the reactants themselves.

Our process may be practiced over a wide range of temperature and will be found to vary to some extent with the reactants and the activity of the catalyst. Polymerization temperatures ordinarily, however, come within a range of from about —60° to about 300° C. such as from 10° to 80° C., and preferably 25° to 60° C.

The pressures utilized likewise may vary rather widely. High molecular weight olefins may be polymerized, in accordance with our invention, at atmospheric pressure. With normally gaseous olefins superatmospheric pressure is generally desirable in order to provide an adequate concentration of olefin to contact the catalyst in the reaction medium. In general, polymerization of olefins, as practiced by our invention, may be conducted at pressures varying from atmospheric to 10,000 p.s.i.a. and above. In the majority of instances, however, pressures of the order of 15 to about 1500 p.s.i.a. are usually preferred.

While our invention may be effected by bringing into contact the catalyst and olefin under the above-stated reaction conditions, with the olefin in the gaseous, vapor or liquid phase, we ordinarily prefer to conduct our process in the liquid phase with the aid of a solvent when necessary. This solvent should be a relatively inert substance such as saturated aliphatic hydrocarbons starting, for example, with heptane, cyclic hydrocarbons such as tetralin, cyclohexane, and the like. Aromatic solvents such as benzene, toluene, the xylenes, the cymenes, and the like, may be used in the process of our inventiton. However, in certain cases, we have found that our catalyst functions not only to promote the polymerization of olefins but likewise is capable of catalyzing the alkylation of aromatics with certain olefins.

The process of our invention may be further illustrated by the following specific examples:

EXAMPLE I

A technical grade of $V_2O_5$ (3.6 g.) was sealed in a filter paper and placed in a vessel containing 130 g. of heptane and 10.1 g. of silicon tetrachloride. The vessel was sealed and heated for 15 hours at a temperature of 130–150° C. An extract was recovered from the vessel, thus leaving a $V_2O_5$ residue within the filter paper. The extract (123 g.) contained 2.9 wt. percent $SiCl_4$ and vanadium compounds analyzed as 0.53 wt. percent V. This extract was placed in a reactor and ethylene was bubbled through the extract for a period of 10 minutes. Subsequently, 1.9 g. of $Al(iC_4H_9)_3$ was added to the heptane-extract-olefin mixture after which a total of 8.7 g. of ethylene was added to the reactor. The reactor was maintained at atmospheric pressure for a period of 0.3 hour at a temperature of 28–55° C. A total of 8.3 g. of product was recovered from the polymerization reaction. The product had an intrinsic viscosity of 5.3 as determined in accordance with the ASTM designated test D1601–58T.

EXAMPLE II

A technical grade of $V_2O_5$ (3.5 g.) was sealed in a filter paper and placed in a vessel containing 125 g. of heptane and 9.8 g. of silicon tetrachloride. The vessel was sealed and heated for 15 hours at a temperature of 130–150° C. An extract was recovered from the vessel, thus leaving a $V_2O_5$ residue within the filter paper. The extract (123 g.) contained 1.3 wt. percent $SiCl_4$ and vanadium compounds analyzed as 0.23 wt. percent V. This extract was placed in a reactor and ethylene was bubbled through the extract for a period of 10 minutes. Subsequently, 1.2 g. of $Al(C_2H_5)_2Cl$ was added to the heptane-extract-olefin mixture after which 6.3 g. of ethylene was added to the reactor. The reactor was maintained at atmospheric pressure for a period of 0.2 hour at a temperature of 28–55° C. A total of 7.0 g. of product was recovered from the polymerization reaction. The product had an intrinsic viscosity of 1.7 as determined in accordance with the ASTM designated test D1601–58T.

EXAMPLE III

A technical grade of $V_2O_5$ was sealed in a filter paper and placed in a vessel containing 145 g. of $n-C_7H_{16}$ and silicon tetrachloride. The vessel was sealed and heated for 15 hours at a temperature of 130–150° C. An extract was recovered from the vessel, thus leaving a $V_2O_5$ residue within the filter paper. The extract contained 8.5 g. of $SiCl_4$ and vanadium compounds analyzed as 0.34 g. V. The extract was placed in a reactor and propylene was bubbled through the extract for a period of 10 minutes. Subsequently, 1.2 g. of $Al(C_2H_5)_2Cl$ was added to the reactor. The reactor was maintained at a pressure of 20 p.s.i.g. adding propylene. The reaction was carried out at a temperature of 48–55° C. for 0.7 hour. A total of 12.9 g. of product was recovered. The product was rubbery in that it would stretch and rebound.

EXAMPLE IV

A technical grade of $V_2O_5$ was sealed in a filter paper and placed in a reactor containing 200 g. of $n-C_7H_{16}$ and silicon tetrachloride. The vessel was sealed and heated for 15 hours at a temperature of 130–150° C. An extract was recovered from the vessel, thus leaving a $V_2O_5$ residue within the filter paper. The extract contained 2.5 g. of $SiCl_4$ and vanadium compounds analyzed as 0.17 g. of V. This extract was placed in a reactor and propylene was bubbled through the extract solution for a period of 10 minutes. Subsequently, 0.6 g. of $Al(C_2H_5)_2Cl$ was added to the reactor after which 34 g. of propylene was added to the reactor. The reactor was maintained at atmospheric pressure for a period of 0.7 hour at a temperature of 26–47° C. A total of 8.5 g. of product was recovered from the polymerization reaction. The product was rubbery in that it would stretch and rebound.

EXAMPLE V

A technical grade of $V_2O_5$ was sealed in a filter paper and placed in a vessel containing 62 g. of $n-C_7H_{16}$ and silicon tetrachloride. The vessel was sealed and heated for 15 hours at a temperature of 130–150° C. An extract was recovered from the vessel, thus leaving a $V_2O_5$ residue within the filter paper. The extract contained 2.5 g. of $SiCl_4$ and vanadium compounds analyzed as 0.17 g. of V. This extract was placed in a reactor and propylene was bubbled through the extract for a period of 10 minutes. Subsequently, 0.6 g. of $Al(C_2H_5)_2Cl$ was added to the reactor after which 34 g. of propylene was added to the reactor. The reactor was maintained at atmospheric pressure for a period of 0.7 hour at a temperature of 28–43° C. A total of 5.1 g. of product was recovered. The product was rubbery in that it would stretch and rebound.

EXAMPLE VI

A technical grade of $V_2O_5$ (12.9 g.) was placed in a vessel containing 167 ml. of n-heptane and 7.5 g. of $SiCl_4$. The vessel was sealed and heated for 21 hours at a temperature of 80–100° C. An extract was recovered from the vessel, thus leaving a $V_2O_5$ residue in the vessel. The extract (44 g.) was combined with 19.3 g. of 1-pentene and 2.1 g. of $Al(iC_4H_9)_3$. The materials were allowed to polymerize for a period of 5.7 hours at a temperature of 35–86° C. A total of 9.0 g. of product was recovered. The product was rubbery in that it would stretch and rebound.

EXAMPLE VII

A technical grade of $V_2O_5$ (16.3 g.) was placed in a vessel containing 29.6 g. of $SiCl_4$ and 557 ml. of n-heptane. The vessel was heated for 16 hours at a temperature of 110° C. An extract was recovered from the vessel, thus leaving a $V_2O_5$ residue within the vessel. A portion of the extract (33.4 g.) was combined with 31.0 g. of 1-pentene and subsequently 2.06 g. of $(C_2H_5)MgBr$. The ingredients were allowed to polymerize at a pressure of 58 p.s.i.g. for a period of 3.7 hours at a temperature of 29–100° C. A total of 0.8 g. of a rubbery product was recovered.

EXAMPLE VIII

A technical grade of $V_2O_5$ (4 g.) was placed in an alundum thimble and Soxhlet extracted with an n-pentane solvent containing 3.0 g. of $SiCl_4$. An extract was recovered and combined with 14.0 g. of isoprene and subsequently 2.0 g. of $Al(iC_4H_9)_3$ was added to the extract-olefin mixture. The materials were allowed to polymerize at atmospheric pressure for 16.0 hours at a temperature of 35° C. A total of 1.0 g. of polymer product was recovered. The product was rubbery in nature. The product contained 3,4-double bonds predominantly; however, some 1,4-trans double bonds were also present.

EXAMPLE IX

An extract was prepared, in the absence of a solvent, by utilizing the apparatus illustrated in FIGURE 1. A commercial technical grade of $V_2O_5$ (30–40 g.) which had been previously heated in air to a temperature of 150° C. was added to Column A. $SiCl_4$ (100–140 g.) was then added to Column B. A nitrogen atmosphere was maintained in the column. Heating tapes were used to maintain Column A at 150° C. and Column B at 200° C. Heating was continued for 120–240 hours. The tips of the columns were sealed with rubber syringe bottle caps, and the silicon tetrachloride extract transferred to a storage bottle by means of a hypodermic syringe equipped with a long, stainless steel needle. A portion of the extract (3 g.) contained 2.85 g. of $SiCl_4$ and vanadium compounds analyzed as 0.15 g. V. The extract was placed in a reactor and an olefin stream along with 1.2 g. of $Al(iC_4H_9)_3$ was added thereto. The rate of addition of the olefin was 3.68 mols per hour of $C_2H_4$ and 7.36 mols per hour of $C_3H_6$. The reactor was maintained at a temperature of 50–60° C. at atmospheric pressure for a period of 25 minutes. A copolymer product (27 g.) was recovered. The product appeared rubbery and contained 57 mol percent $C_3$ with an intrinsic viscosity of 2.7 as determined in accordance with the ASTM designated test D1601–58T. The product was cured using a formulation containing carbon black, red lead, dicumyl peroxide, sulfur, and quinone dioxime. The resultant tensile strength was about 2900 p.s.i.

EXAMPLE X

A technical grade of $TiO_2$ (6.5 g.) was placed in a vessel containing n-$C_7H_{16}$ and 200 g. of silicon tetrachloride. The vessel was sealed and heated for 15 hours at a temperature of 130–150° C. An extract was recovered from the vessel, thus leaving a residue of $TiO_2$ in the vessel. The extract contained titanium compounds analyzed as 0.06 mg. of Ti. This extract was placed in a reactor and propylene added thereto. Subsequently, 0.2 g. of $Al(iC_4H_9)_3$ was added to the reactor. The reactor was maintained at a temperature of 30–48° C. and a pressure of 82 p.s.i.g. for a period of 15.0 hours. A total of 1.2 g. of product was recovered.

EXAMPLE XI

A technical grade of $MoO_3$ (9.6 g.) was placed in a vessel containing n-$C_7H_{16}$ and 61.6 g. of silicon tetrachloride. The vessel was sealed and heated for 15 hours at a temperature of 130–150° C. An extract was recovered from the vessel, thus leaving a residue of $MoO_3$ in the vessel. This extract was placed in a reactor and propylene added thereto. Subsequently, 0.42 g. of $Al(iC_4H_9)_3$ was added to the reactor. The reactor was maintained at a temperature of 30–47° C. and a pressure of 43–60 p.s.i.g. for a period of 2.0 hours. A solid polymer product was recovered.

EXAMPLE XII

A technical grade of $Cr_2O_3$ (13 g.) was placed in a vessel containing n-$C_7H_{16}$ and 102.4 g. of silicon tetrachloride. The vessel was sealed and heated for 15 hours at a temperature of 130–150° C. An extract was recovered from the vessel, thus leaving a residue of $Cr_2O_3$ in the vessel. The extract contained 4.13 mg. of $SiCl_4$ and chromium compounds analyzed as 0.26 mg. of $SiCl_4$. This extract was placed in a reactor and propylene added thereto. Subsequently, 1.05 g. of $Al(iC_4H_9)_3$ was added to the reactor. The reactor was maintained at a temperature of 28–40° C. and a pressure of 55–70 p.s.i.g. by adding propylene for a period of 1.1 hours. A solid polymer product was recovered.

EXAMPLE XIII

An extract prepared in accordance with the procedure outlined in Example IX containing 1.38 g. of $SiCl_4$ and containing vanadium compounds analyzed as 0.12 g. V was combined with 385 g. of an olefin stock. The olefin contained 91.05 mol percent propylene and 8.95 mol percent ethylene. Subsequently, 0.6 g. of $Al(iC_4H_9)_3$ was added to the catalyst-olefin mixture. The olefin was copolymerized at a temperature of from 19.5–35.5° C. and at a pressure of 150–250 p.s.i.g. for a period of 90 minutes. A total of 72 g. of product was recovered. The product had a rubbery appearance and contained 81 mol percent $C_3$. The intrinsic viscosity, as determined in accordance with the ASTM designated test D1601–58T, of the rubbery product was 3.2. The rubbery product was cured and the resultant tensile strength of the product was 3200 p.s.i.

EXAMPLE XIV

An extract prepared in accordance with the procedure outlined in Example IX was combined with an olefin stock. A total of 0.5 ml. of extract containing vanadium compounds analyzed as 0.02 g. of V was added to a reactor along with 7.2 g. of 1-butene. Ethylene was added to the reactor to increase the pressure of the reactor to 55 p.s.i.g. Subsequently, 0.3 g. of $Al(iC_4H_9)_3$ was added to the reactor. The mixture was polymerized at a pressure of 55 p.s.i.g. by the addition of ethylene for a period of 2 minutes. A total of 2.7 g. of product was recovered. The product contained 28 wt. percent butene. The intrinsic viscosity, as determined in accordance with the ASTM designated test D1601–58T, of the rubbery product was 5.7.

EXAMPLE XV

An extract (0.75 g.) prepared in accordance with the procedure outlined in Example IX containing vanadium compounds analyzed as 0.023 g. of V was charged to a reactor containing 301 ml. of n-$C_7H_{16}$. Subsequently, 0.3 g. of $Al(iC_4H_9)_3$ was added to the reactor after which time a total of 6.9 g. of ethylene and 13.7 g. of propylene were added to the reactor. The olefins were copolymerized at a temperature of 26–44° C. at atmospheric pressure for a period of 12.5 minutes. A total of 7.0 g. of product was recovered. The intrinsic viscosity, as determined in accordance with the ASTM designated test D1601–58T, of the rubbery product was 3.4. The product contained 32 mol percent $C_3$.

EXAMPLE XVI

An extract (0.75 g.) prepared in accordance with the procedure outlined in Example IX containing vanadium compounds analyzed as 0.023 g. of V was charged to a reactor containing 301 ml. of n-$C_7H_{16}$, 6.9 g. of $C_2H_4$ and 13.7 g. of $C_3H_6$. Subsequently, 0.3 g. of Al($iC_4H_9$)$_3$ was added to the reactor. The olefins were copolymerized at a temperature of 26–44° C. at atmospheric pressure for a period of 12.5 minutes. A total of 6.6 g. of product was recovered. The intrinsic viscosity, as determined in accordance with the ASTM designated test D1601–58T, of the rubbery product was 2.6.

The catalyst of the present invention is particularly desirable for the preparation of ethylene-propylene copolymers. The ethylene-propylene copolymers have excellent elastomeric properties. The following example illustrates the rubber-like properties obtained by copolymerizing a propylene-ethylene mixture.

EXAMPLE XVII

An extract (3.0 g.) prepared in accordance with the procedure outlined in Example IX containing vanadium compounds analyzed as 0.24 g. of V was charged to a reactor containing 1329 g. of a propylene-ethylene mixture. The propylene-ethylene mixture contained a mol ratio of propylene to ethylene of 9.3:1. Subsequently, 2.4 g. of Al($iC_4H_9$)$_3$ was added to the reactor. The olefins were copolymerized at 75–375 p.s.i.g. and 20–70° C. for a period of 2 hours. A total of 232 g. of copolymer was recovered. The raw copolymer contained 53 mol percent propylene. It was cured by a formulation similar to that described in Example IX. The following physical properties were obtained and compared with physical properties desired in SBR rubber:

| Property | Extract catalyst copolymer | SBR[1] |
|---|---|---|
| Tensile Strength, p.s.i. | 3,720 | 3,380 |
| Percent Elongation | 520 | 520 |
| $M_{200}$, p.s.i. | 1,380 | 1,810 |
| $M_{300}$, p.s.i. | 3,480 | |
| Percent Set | 10 | |
| Shore A Hardness | 59 | 59 |
| Resilience, Yerzley (ASTM D945-55) | 55 | [2] 49 |

[1] Rubber Handbook by Vanderbilt, 1958 edition, page 419.
[2] Standard SBR rubber as designated by the National Bureau of Standards.

The following example illustrates the transition metal oxide may be extracted with the silicon compound under conditions wherein the silicon compound is in the gaseous phase.

EXAMPLE XVIII 61.6 g. of $SiCl_4$ and 420 ml. of n-$C_7H_{16}$ was placed in a reboiler. A distillation column (FIGURE 4) was placed above the reboiler for the purpose of separating the silicon compound from the solvent, returning the solvent to the reboiler and allowing the silicon compound (in the gaseous phase) to pass through a bed of 25 g. of $MoO_3$. The $MoO_3$ was maintained above the boiling point of the silicon compound to prevent the condensation of the silicon compound on the transition metal oxide. The gaseous stream, subsequent to passing through the $MoO_3$, was condensed and returned to the reboiler. The extract recovered from the above process was added to a reactor containing propylene and 0.5 g. of Al($iC_4H_9$)$_3$. The propylene was polymerized at a temperature of 30–90° C. and at a pressure of 43–60 p.s.i.g. for a period of 2.0 hours. A solid polymer product was recovered.

A comparison of a common polymerization catalyst, i.e., a $VOCl_3$—Al($iC_4H_9$)$_3$ catalyst and the new $SiCl_4$—$V_2O_5$ extract catalyst was made. The data obtained from this comparison are tabulated in Table 1.

*Table 1*

COMPARISON SiCl₄ EXTRACT CATALYST WITH VOCl₃—Al(iC₄H₉)₃ ATMOSPHERIC PRESSURE COPOLYMERIZATION ETHYLENE AND PROPYLENE

| Catalyst Type | Solvent n-$C_7H_{16}$, ml. | Catalyst | | | Monomers | | | Reaction Conditions | | Product | | |
|---|---|---|---|---|---|---|---|---|---|---|---|---|
| | | Extract, | V, g. | Al($iC_4H_9$)$_3$, g. | Mol/hr. | | Mol Ratio, $C_3/C_2$ | Temp., °C. | Time, Min. | Yield,[a] g./g./hr. | [η] | $C_3$, Mol percent |
| | | | | | $C_2H_4$ | $C_3H_6$ | | | | | | |
| SiCl₄ Extract | 251 | 0.75 | 0.022 | 0.3 | 3.35 | 3.35 | 1 | 21–24 | 5 | 302 | 4.7 | 35 |
| SiCl₄ Extract | 251 | 0.75 | 0.022 | 0.3 | 2.24 | 4.46 | 2 | 22–24 | 5 | 212 | [b] 4.0 | 51 |
| SiCl₄ Extract | 251 | 0.75 | 0.022 | 0.3 | 1.67 | 5.03 | 3 | 20–25 | 5 | [b] 167 | [b] 3.3 | [b] 59 |
| SiCl₄ Extract | 251 | 0.75 | 0.06 | 0.3 | 1.33 | 5.26 | 4 | 23–29 | 5 | 120 | 3.2 | 66 |
| VOCl₃—Al(iC₄H₉)₃ | 250 | 0 | 0.029 | 0.3 | 3.35 | 3.35 | 1 | 25–32 | 5 | 232 | 4.6 | 25 |
| VOCl₃—Al(iC₄H₉)₃ | 251 | 0 | 0.029 | 0.3 | 2.24 | 4.46 | 2 | 22–29 | 5 | [b] 113 | [b] 3.8 | [b] 32 |
| VOCl₃—Al(iC₄H₉)₃ | 251 | 0 | 0.029 | 0.3 | 1.67 | 5.0 | 3 | 24–28 | 5 | [b] 113 | [b] 4.4 | [b] 38 |
| VOCl₃—Al(iC₄H₉)₃ | 251 | 0 | 0.029 | 0.3 | 1.34 | 5.36 | 4 | 22–28 | 5 | [b] 109 | [b] 2.9 | [b] 49 |

[a] The yield is expressed as g. polymer/g. V plus Al($iC_4H_9$)$_3$/hour reaction time.
[b] Average of two runs.

A catalyst system for copolymerization of ethylene with other olefins such as, for example, propylene and higher olefins normally will exhibit a far greater activity toward ethylene. In a feed stream, for example, containing a 1:1 mol ratio of propylene to ethylene, most copolymerization catalysts will exhibit poor activity toward propylene. Our catalyst exhibits extremely unusual activity toward propylene in a propylene-ethylene feed stream. For example, in a feed stream containing a 1:1 mol ratio of propylene to ethylene, the use of our catalyst gives a reaction product containing as much as 35 mol percent propylene. A product containing in excess of 50 mol percent propylene may be obtained by using our catalyst in combination with a feed stream containing as little as 2:1 mol ratio of propylene to ethylene.

The selectivity of our catalyst toward propylene in copolymerizing a propylene-ethylene feed stream, is far superior to a $VOCl_3$—Al($iC_4H_9$)$_3$ catalyst. A comparison of our catalyst with the $VOCl_3$—Al($iC_4H_9$)$_3$ catalyst as a function of mol percent propylene in the product is illustrated in FIGURE 2. The data in FIGURE 2 are taken from Table 1. The reaction rate of our catalyst is also far superior to the reaction rate of a $VOCl_3$—Al($iC_4H_9$)$_3$ catalyst. The improved reaction rate of our catalyst is illustrated in FIGURE 3.

Additional runs were made to determine if the improved reaction rate and the improved selectivity of our catalyst was due to the presence of $SiCl_4$ in a $$VOCl_3—Al(iC_4H_9)_3$$

catalyst system. In the comparison runs, $SiCl_4$ was added directly to the VOCl₃—Al(iC₄H₉)₃ catalyst. Data obtained from these runs are as follows:

*Table II*

ADDITION SiCl₄ TO VOCl₃—Al(iC₄H₉)₃ CATALYST COPOLYMERIZATION ETHYLENE WITH PROPYLENE OR 1-BUTENE

| Solvent n-C₇H₁₆, ml. | Catalyst | | | Monomers | | | Reaction Conditions | | | Product | | |
|---|---|---|---|---|---|---|---|---|---|---|---|---|
| | SiCl₄, g. | VOCl₃, g. | Al(iC₄H₉)₃, g. | Mol/hr. | | C₄H₈, g. | Temp., °C. | Time, Min. | Press., p.s.i.g. | Yield, g. | C₃ or C₄, Mol percent | [η] |
| | | | | C₂H₄ | C₃H₆ | | | | | | | |
| 75 | 0.75 | 0.17 | 0.6 | (*) | 0 | 7.3 | 26–63 | 2 | 55 | 3.0 | 21 | 1.5 |
| 75 | 0 | 0.17 | 0.6 | (*) | 0 | 7.3 | 26–61 | 2 | 55 | 2.9 | 18 | 3.7 |
| 250 | 0 | 0.01 | 0.3 | 0.86 | 1.9 | 0 | 11–12 | 5 | Atm. | 0.58 | 31 | 3.5 |
| 250 | 0 | 0.01 | 0.3 | 0.86 | 1.9 | 0 | 13–15 | 5 | Atm. | 0.56 | 33 | 6.7 |
| 250 | 0.7 | 0.01 | 0.3 | 0.86 | 1.9 | 0 | 14–16 | 5 | Atm. | 0.31 | 32 | 4.1 |
| 250 | 0.7 | 0.01 | 0.3 | 0.86 | 1.9 | 0 | 12–14 | 5 | Atm. | 0.30 | 33 | 4.1 |

* Ethylene was added to the reactor containing heptane, 1-butene VOCl₃, and SiCl₄ to increase the pressure to 55 p.s.i.g.

The following results were noted:
(1) In the ethylene-1-butene copolymerization runs, no significant difference in yield resulted from the addition of SiCl₄.
(2) In the ethylene-1-butene copolymerization runs, no significant difference in mol percent butene in the product resulted from the addition of the SiCl₄ to the catalyst.
(3) In the ethylene-propylene copolymerization runs, no significant difference in mol percent of propylene in the product resulted from the addition of the SiCl₄ to the catalyst.

In summation, the direct addition of SiCl₄ to a

VOCl₃—Al(iC₄H₉)₃ catalyst does not aid the reaction rate, does not increase the mol percent propylene in the product, and does not increase the over-all yield of product.

The disclosed extract type of catalyst exhibits unusual olefin copolymerization properties. This catalyst will yield a rubbery product in the copolymerization of a propylene-olefin feed stock. It is possible to obtain a rubbery product in the copolymerization of propylene and ethylene, which product contains an excess of 60 mol percent propylene. The polymerization reaction rate expressed as the quantity of product per unit of catalyst per unit of time is greater than other known copolymerization catalysts.

The polymers produced by the process of this invention can be subjected to such after-treatment as may be desired to fit them for particular uses or to impart desired properties. Thus, the polymers can be extruded, mechanically milled, filmed or cast, or converted to sponges or lattices. Antioxidants, stabilizers, fillers, extenders, plasticizers, pigments, insecticides, fungicides, etc., can be incorporated in the polymers and/or in by-product alkylates or "greases." The polymers may be employed as coating materials, gas barriers, binders, etc., to even a wider extent than polyethylenes made by prior processes.

The polymers produced by the process of the present invention, especially the polymers having high specific viscosities, can be blended with the lower molecular weight polyethylene to impart stiffness or flexibility or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about .01 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, provided by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected.

We claim:
1. In a process for the polymerization of olefinic hydrocarbons having an unsaturated bond in the alpha position, the improvement which comprises contacting said hydrocarbons under polymerization conditions with a catalyst consisting essentially of (1) a compound selected from the group consisting of aluminum alkyl, aluminum alkyl halide and magnesium alkyl halide, and (2) a silicon tetrachloride extract of an oxide of a transition metal selected from the group consisting of vanadium pentoxide, titanium dioxide, molybdenum trioxide and chromic oxide, prepared by contacting said silicon tetrachloride with said oxide for a period of time such that said extract contains from about 1 to about 10 weight percent of a transition metal derived from said oxide, and separating said extract from said oxide.

2. The process of claim 1 wherein the olefinic hydrocarbon is ethylene.

3. The process of claim 1 wherein the olefinic hydrocarbon is propylene.

4. The process of claim 1 wherein the olefinic hydrocarbon is a mixture of ethylene and propylene.

5. The process of claim 1 wherein said silicon tetrachloride is contacted with said oxide of a transition metal at a temperature of at least about 60° C.

6. The process of claim 1 wherein said compound is triisobutyl aluminum and said oxide of a transition metal is vanadium pentoxide.

7. The process of claim 1 wherein said compound is diethyl aluminum chloride and said transition metal oxide is vanadium pentoxide.

8. The process of claim 1 wherein said compound is ethyl magnesium bromide and said transition metal oxide is vanadium pentoxide.

9. A catalyst for the polymerization of olefinic hydrocarbons having an unsaturated bond in the alpha position, consisting essentially of (1) a compound selected from the group consisting of aluminum alkyl, aluminum alkyl halide and magnesium alkyl halide, and (2) a silicon tetrachloride extract of an oxide of a transition metal selected from the group consisting of vanadium pentoxide, titanium dioxide, molybdenum trioxide and chromic oxide, prepared by contacting said silicon tetrachloride with said oxide for a period of time such that said extract contains from about 1 to about 10 weight percent of a transition metal derived from said oxide, and separating said extract from said oxide.

10. The catalyst of claim 9 wherein said silicon tetrachloride is contacted with said oxide of a transition metal at a temperature of at least about 60° C.

11. The catalyst of claim 9 wherein said compound is triisobutyl aluminum and said oxide of a transition metal is vanadium pentoxide.

12. The catalyst of claim 9 wherein said compound is diethyl aluminum chloride and said transition metal oxide is vanadium pentoxide.

13. The catalyst of claim 9 wherein said compound is ethyl magnesium bromide and said transition metal oxide is vanadium pentoxide.

14. The method of preparing a polymerization catalyst including the steps of contacting an oxide of a transition metal selected from the group consisting of vanadium pentoxide, titanium dioxide, molybdenum trioxide and chromic oxide with silicon tetrachloride for a period of time such that a silicon tetrachloride extract is formed which contains from about 1 to about 10 weight percent of a transition metal derived from said oxide, recovering said extract therefrom and mixing said extract with a compound selected from the group consisting of aluminum alkyl, aluminum alkyl halide and magnesium alkyl halide.

15. The method of claim 14 wherein said silicon tetrachloride is contacted with said oxide of a transition metal at a temperature of at least about 60° C.

References Cited in the file of this patent
UNITED STATES PATENTS

| | | |
|---|---|---|
| 2,886,561 | Reynolds et al. | May 12, 1959 |
| 2,920,062 | McFarland | Jan. 5, 1960 |
| 2,930,785 | Edmonds | Mar. 29, 1960 |

OTHER REFERENCES

Lange: Handbook of Chemistry, Handbook Publishers, Sandusky (1956), pages 322–323.

UNITED STATES PATENT OFFICE
CERTIFICATE OF CORRECTION

Patent No. 3,112,297                             November 26, 1963

Leon B. Gordon et al.

It is hereby certified that error appears in the above numbered patent requiring correction and that the said Letters Patent should read as corrected below.

Column 3, line 37, for "inventiton" read -- invention --; column 6, line 17, for "SiCl$_4$" read -- Cr. --; column 7, line 67, footnote "2", for "B eau" read -- Bureau --.

Signed and sealed this 21st day of April 1964.

(SEAL)
Attest:

ERNEST W. SWIDER                             EDWARD J. BRENNER

Attesting Officer                               Commissioner of Patents